United States Patent
Nishio et al.

(10) Patent No.: US 9,777,692 B2
(45) Date of Patent: Oct. 3, 2017

(54) EXHAUST PURGE DEVICE FOR GAS INTERNAL COMBUSTION ENGINE

(71) Applicant: Mitsubishi Heavy Industries, Ltd., Tokyo (JP)

(72) Inventors: Hideki Nishio, Tokyo (JP); Michiyasu Ishida, Tokyo (JP); Hirotoshi Kitagawa, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 38 days.

(21) Appl. No.: 14/779,959

(22) PCT Filed: Jan. 29, 2014

(86) PCT No.: PCT/JP2014/051928
§ 371 (c)(1),
(2) Date: Sep. 24, 2015

(87) PCT Pub. No.: WO2014/156281
PCT Pub. Date: Oct. 2, 2014

(65) Prior Publication Data
US 2016/0061176 A1 Mar. 3, 2016

(30) Foreign Application Priority Data

Mar. 29, 2013 (JP) ................................ 2013-073840

(51) Int. Cl.
*F02N 19/00* (2010.01)
*F02B 29/00* (2006.01)
(Continued)

(52) U.S. Cl.
CPC .......... *F02N 19/001* (2013.01); *F01N 3/021* (2013.01); *F01N 3/32* (2013.01); *F01N 9/00* (2013.01);
(Continued)

(58) Field of Classification Search
CPC ... F01N 3/021; F01N 3/32; F01N 9/00; F01N 13/08; F01N 2260/06; F01N 2900/08;
(Continued)

(56) References Cited

U.S. PATENT DOCUMENTS 5,233,226 A * 8/1993 Hanover ................... B63J 2/06
114/211
5,507,263 A 4/1996 Yamazaki et al.
(Continued)

FOREIGN PATENT DOCUMENTS

CN 1109945 A 10/1995
CN 101743386 A 6/2010
(Continued)

OTHER PUBLICATIONS

Mitsubishi Heavy Indrustries, LTD., European Search Report, App. No. 14775816.3, Mailed Jan. 22, 2016, 7 Pages.
(Continued)

*Primary Examiner* — Audrey K Bradley
(74) *Attorney, Agent, or Firm* — Berkeley Law & Technology Group, LLP

(57) ABSTRACT

In particular embodiments, a starting device for a gas internal combustion engine whereby non-combusted gas accumulating in the gas internal combustion engine and an exhaust channel is discharged during ignition startup of the gas engine and abnormal combustion is reduced in the occurrence so as to improve safety, breakage prevention, durability and reliability. An exhaust purge device for a gas internal combustion engine 1, which operates using flammable gas as fuel, includes an exhaust channel 16 forming an exhaust channel of the gas internal combustion engine 1, a blast pipe 71 connected to an upstream portion of the exhaust pipe at a first end, an exhaust purge fan 7 connected to a second end of the blast pipe 71 and configured to send (Continued)

ambient air to the exhaust channel 16, and a control device 2 for performing a control to drive the exhaust purge fan 7.

4 Claims, 4 Drawing Sheets

(51) Int. Cl.
    *G01N 3/32*     (2006.01)
    *F02D 19/02*     (2006.01)
    *F01N 3/32*     (2006.01)
    *F02D 41/04*     (2006.01)
    *F02D 41/00*     (2006.01)
    *F01N 3/021*     (2006.01)
    *F01N 9/00*     (2006.01)
    *F01N 13/08*     (2010.01)

(52) U.S. Cl.
    CPC .............. *F01N 13/08* (2013.01); *F02B 29/00* (2013.01); *F02D 19/023* (2013.01); *F02D 41/0027* (2013.01); *F02D 41/042* (2013.01); *F01N 2260/06* (2013.01); *F01N 2900/08* (2013.01); *Y02T 10/146* (2013.01); *Y02T 10/20* (2013.01); *Y02T 10/32* (2013.01)

(58) Field of Classification Search
    CPC .. F02N 19/001; F02D 19/023; F02D 41/0027; F02D 41/042; F02B 29/00; Y02T 10/146; Y02T 10/20; Y02T 10/32
    See application file for complete search history.

(56) References Cited

U.S. PATENT DOCUMENTS

| | | | |
|---|---|---|---|
| 6,192,678 B1 | 2/2001 | Tachibana | |
| 2004/0200212 A1* | 10/2004 | Katogi | ...................... F01N 3/22 |
| | | | 60/290 |
| 2007/0163246 A1* | 7/2007 | Wassmur | .............. F01N 3/2046 |
| | | | 60/286 |
| 2008/0034733 A1 | 2/2008 | Miller et al. | |
| 2009/0151425 A1 | 6/2009 | Miwa | |

FOREIGN PATENT DOCUMENTS

| | | |
|---|---|---|
| EP | 1806582 A1 | 7/2007 |
| EP | 2171226 B1 | 8/2011 |
| JP | S50313 U | 1/1975 |
| JP | S61185669 A | 8/1986 |
| JP | H04550415 A | 2/1992 |
| JP | H06200829 A | 7/1994 |
| JP | 3631035 B2 | 3/2005 |
| JP | 2007146807 A | 6/2007 |
| JP | 2009145219 A | 7/2009 |
| JP | 2012202376 A | 10/2012 |
| WO | 2014156281 A1 | 10/2014 |

OTHER PUBLICATIONS

Decision to Grant a Patent, App. No. JP2013-073840, Drafting Date Jul. 19, 2016, 6 Pages.
Notification Concerning Submission, Obtention or Transmittal of Priority Document, App. No. PCT/JP2014/051928, Filed Jan. 29, 2014, Mailed Mar. 20, 2014, 1 Page.
Notification Concerning Transmittal of International Preliminary Report on Patentability, App. No. PCT/JP2014/051928, Filed Jan. 29, 2014, Mailed Oct. 8, 2015, 11 Pages.
International Search Report, App. No. PCT/JP2014/051928, Filed Jan. 29, 2014, Mailed Mar. 25, 2014, 10 Pages.
Office Action, App. No. KR 10-2015-7025644, Filed Sep. 17, 2015, Mailed Nov. 24, 2016, 12 Pages.
First Office Action, Chinese App. No. 201480016530.3, issued Apr. 19, 2017, 12 Pages.

* cited by examiner

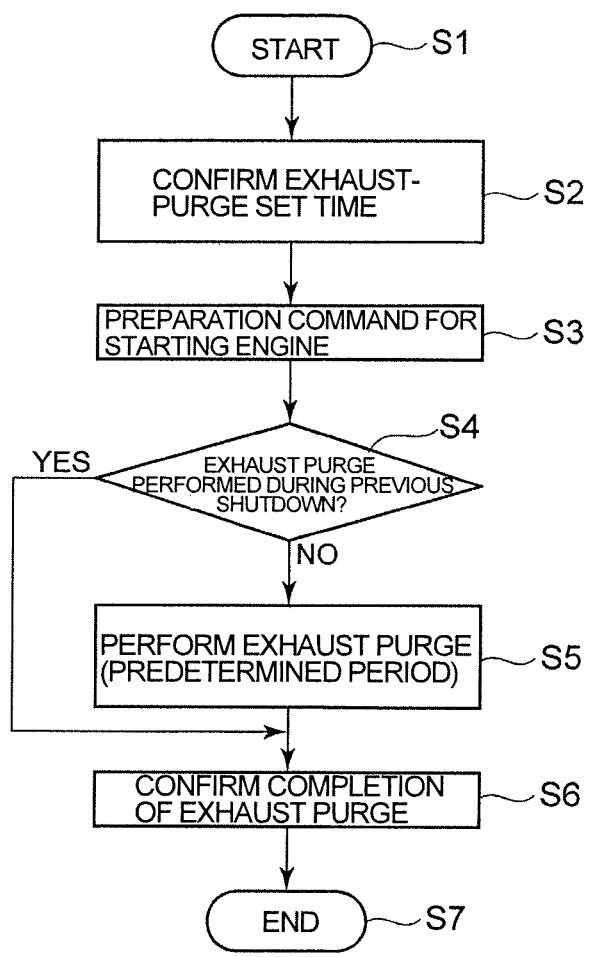

EXHAUST PURGE DEVICE FOR GAS INTERNAL COMBUSTION ENGINE

TECHNICAL FIELD

The present invention relates to an exhaust purge device for a precombustion-chamber type lean premixed gas internal combustion engine, for discharging gas accumulating in an exhaust channel before startup of the gas internal combustion engine.

BACKGROUND

In a precombustion-chamber type lean premixed gas internal combustion engine (hereinafter, referred to in short as a gas engine), there is a starting method adopting slow air turning, in which compressed air (not comprising fuel gas) is introduced into cylinders to rotate a gas engine before starting an air starting device, for the purpose of checking the inside of the cylinders, securing lubrication of the sliding surfaces of the cylinders and pistons that slide inside the cylinders, and reducing the preparation work before starting. In a gas internal combustion engine that performs slow air turning, compressed air that is used during slow air turning and until startup of the engine using compressed air (not comprising fuel gas) is performed subsequently to slow air turning performs the role of exhaust purge before startup of the gas engine.

However, to secure supply and safety of the fuel gas for the gas engine, a variety of devices, valves, and the like, are provided, from which unpredictable leakage of the fuel gas may occur. Fuel gas having leaked from the above devices, valves, and the like may flow to and accumulate in the gas engine, an exhaust channel, and the like. If the gas engine is switched to fuel-gas ignition startup under such a condition, the accumulating fuel gas undergoes abnormal combustion and damages the gas engine, the exhaust channel, and the like.

Patent Document 1 discloses performing a dry-air injecting block of injecting dry air into an intake channel and a cranking block of igniting and combusting air-fuel mixture with a spark plug and starting rotation of an output shaft of a gas engine after the dry-air injecting block. As a result, if the gas engine is started, dry air is injected into an air-supply channel before operation of the spark plug, which reduces the absolute humidity inside the intake channel. Thus, if the spark plug operates for the first time after startup, air with low humidity is supplied into a combustion chamber. Accordingly, the surface of electrodes of the spark plug is less likely to get moist, which makes it possible to maintain good insulation resistance between the electrodes, so that the spark plug generates sparks normally and misfire is prevented.

Further, in Patent Document 1, pre-purge, which is to discharge remaining gas in a combustion chamber to the outside via the exhaust channel, is performed. At this time, the first injector, the second injector, and the spark plug are maintained to be shut down. An injection switch valve closes and a starter inlet valve opens. As a result, a starter motor starts to operate and a flywheel is driven to rotate together with an output shaft. Then, the pistons reciprocate without the air-fuel mixture undergoing ignition combustion. In this way, intake valves and exhaust valves are driven by the output shaft, performing opening/closing motion in accordance with the stroke of the pistons. As the reciprocating motion of the pistons is repeated, the remaining gas in the combustion chamber is forced out to the exhaust channel. Instead, dry air is supplied to a main combustion chamber and a precombustion chamber from the intake channel. In this way, it is possible to ventilate the inside of the main combustion chamber and the precombustion chamber with dry air, which makes it possible to prevent non-combusted gas or soot from being incorporated into air-fuel mixture if the air-fuel mixture undergoes ignition combustion for the first time upon startup. The reciprocating motion of the pistons is repeated a certain number of times that is sufficiently large to discharge gas from the main combustion chamber and the precombustion chamber and that is sufficiently small so that air in the supply-air channel does not completely pass through the main combustion chamber.

SUMMARY

Embodiments may provide an exhaust purge device for a gas internal combustion engine that operates using flammable gas as fuel. The exhaust purge device may comprise: an exhaust path connected to an exhaust collecting pipe of the gas internal combustion engine so as to form an exhaust channel; a blast pipe connected to an upstream portion of the exhaust pipe at a first end; an exhaust purge fan connected to a second end of the blast pipe and configured to send ambient air to the exhaust channel; and a control device for performing a control to drive the exhaust purge fan. The control device includes: a purge-fan operation determination part configured to determine whether an exhaust purge fan has been operated during a previous shutdown; and a purge-fan operation command part configured to operate the purge fan for a set time which is set in advance upon next startup of the gas internal combustion engine if the purge-fan operation determination part determines that the exhaust purge fan has not been operated during the previous shutdown.

According to an embodiment, the exhaust purge fan is driven for the set time either after shutdown or immediately before startup of the gas engine to discharge non-combusted gas accumulating in the exhaust channel, which makes it possible to prevent abnormal combustion and to improve reliability upon startup of the gas engine.

Further, in an embodiment, the control device may include a set-time varying device configured to make a set value of the set time variable.

Further, in an embodiment, the set time becomes longer with an increase in a capacity of the exhaust channel.

BRIEF DESCRIPTION OF DRAWINGS

FIG. 4 is an operation flowchart of exhaust purge according to an embodiment.

DETAILED DESCRIPTION

Figure 1:
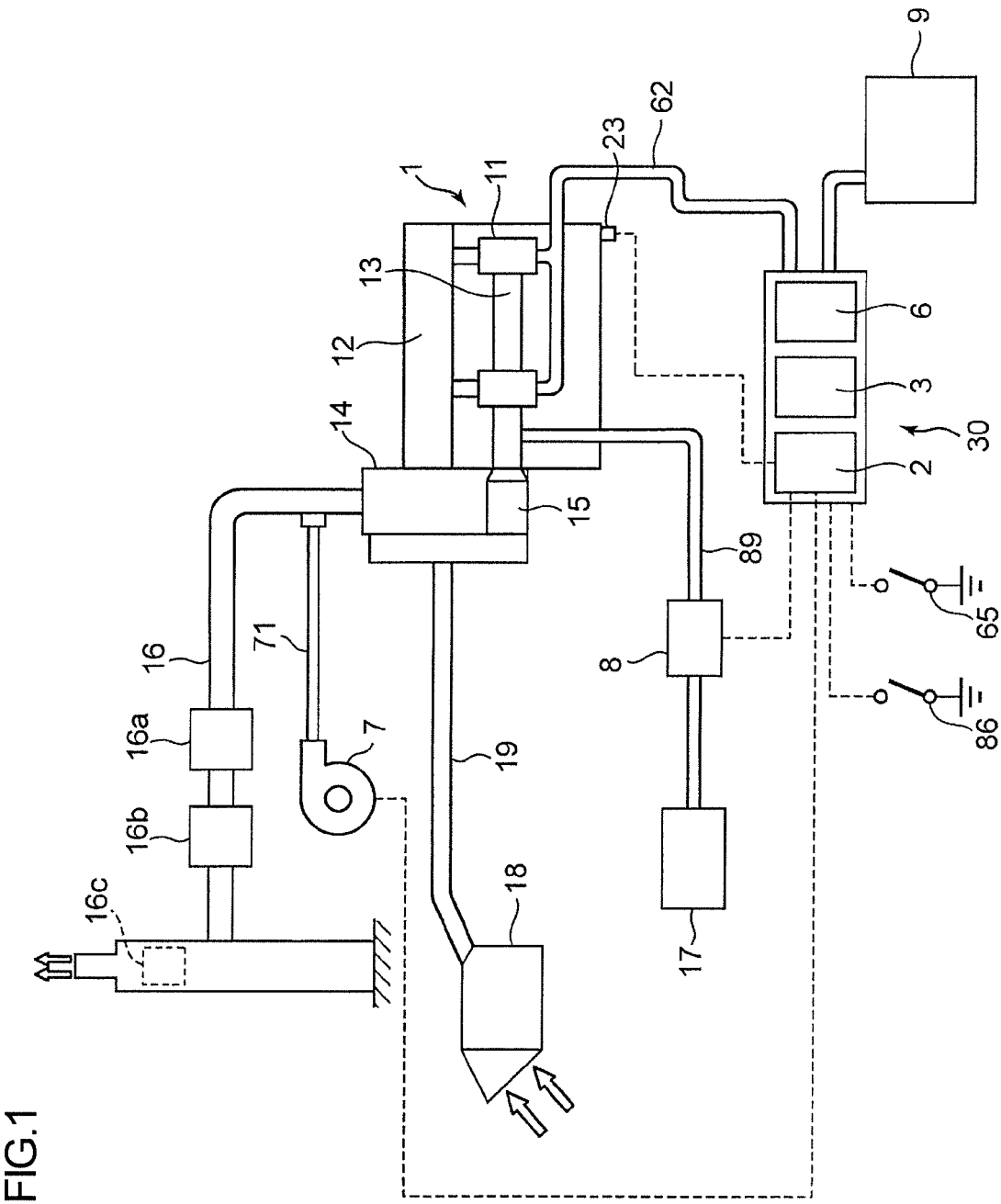
FIG. 1 is a schematic overall configuration diagram of a gas according to an embodiment.

Embodiments of the present invention will now be described in detail with reference to the accompanying drawings. According to Patent Document 1, a second dry-air injecting block is performed after a pre-purge block of reciprocating the pistons without performing ignition combustion with the air-fuel mixture to discharge the remaining gas in the main combustion chamber to the outside from the exhaust channel, and before the cranking block. In this way, dry air is injected again into the supply-air channel. Thus, even though the pre-purge block is performed, if the spark plug operates for the first time after startup, it is possible to prevent air with high humidity from being supplied into the combustion chamber. In the pre-purge block, in order to discharge the remaining gas in the combustion chamber to the exhaust channel, the engine cycle is repeated a certain number of times that is sufficiently large to discharge gas from the main combustion chamber and the precombustion chamber and that is sufficiently small so that air in the supply-air channel does not completely pass through the main combustion chamber. Thus, while it is possible to discharge gas from the main combustion chamber and the precombustion chamber, it is not possible to discharge the gas accumulating in the exhaust channel completely, and thus it is not possible to prevent abnormal combustion in the exhaust channel during fuel-gas ignition operation of the gas engine. Further, the second dry-air injecting block is to dry the inside of the supply-air channel to prevent the spark plug of the combustion chamber from getting moist. Thus, non-combusted gas is accumulating in the gas engine and the exhaust channel, and thus it may not be possible to prevent abnormal combustion if startup of the gas engine is started by the spark plug.

Embodiments may address the above issues, and one or more embodiments may provide a starting device for a gas engine whereby non-combusted gas accumulating in the gas engine and an exhaust channel is discharged before ignition startup of the gas engine and abnormal combustion during ignition startup is prevented so as to improve safety, breakage prevention, durability and reliability. According to an embodiment, on the exhaust side of the gas engine, an exhaust-gas purification device such as a denitration device, a PM filter, and an oxidation catalyst is disposed depending on the set specification of the gas engine. The capacity of the exhaust channel varies depending on the set specification of the exhaust-gas purification device. Thus, since the operation time of the exhaust purge fan for causing the ambient air to flow through the exhaust channel can be easily operated to change to a set time corresponding to the capacity of the exhaust channel, it is possible to ventilate the exhaust channel adequately and to prevent abnormal combustion in the exhaust channel. Further, even if the capacity of the exhaust channel varies depending on the specification of the exhaust-gas purification device disposed in the exhaust channel, the set time can be easily changed by the set-time varying device, which enables the common use of the control device and to reduce the cost for enabling the common use of a component (control device).

Further, in an embodiment, the exhaust purge device may further include an informing device configured to inform of completion of the exhaust purge if the exhaust purge is completed.

According to embodiments, the operator may be informed that the exhaust purge has been completed and that the next operation may be performed, which makes it possible to remind the operator not to perform the next operation during the exhaust purge, and to perform safe starting operation for the gas engine.

According to embodiments, it is possible to provide a starting device for a gas internal combustion engine whereby non-combusted gas accumulating in the gas engine and an exhaust channel is discharged before ignition startup of the gas engine and abnormal combustion during the ignition startup is prevented so as to improve safety, breakage prevention, durability and reliability.

It is intended, however, that unless particularly specified, dimensions, materials, shapes, relative positions and the like of components described in the embodiments shall be interpreted as illustrative only and not limitative of the scope of the present invention.

With reference to FIG. 1, the overall configuration of a precombustion-chamber type lean premixed gas internal combustion engine (hereinafter, referred to in short as a gas engine) according to an embodiment is described. The gas engine 1 includes: an air starting device 30 coupled to the gas engine 1 via the first pipe 62; a compressed-air tank 9 for supplying compressed air to the air starting device 30; a turbocharger 14 mounted to an exhaust-air collecting pipe 12 of the gas engine 1; an exhaust channel 16 for discharging to the atmosphere exhaust gas having driven an exhaust turbine (not illustrated) of the turbocharger 14; an air cleaner 18 for removing dust contained in air that is to be supplied to the gas engine 1; an air cooler 15 coupled coaxially to the exhaust turbine for compressing intake air from the air cleaner 18 and cooling heated supply air; an exhaust-purge fan 7 for exhaust purge coupled to the exhaust channel 16 at the downstream side of the turbocharger 14 in the flow direction of exhaust gas via a blast pipe 71, for blowing air into the exhaust channel 16; a fuel-gas supply device 17 for supplying fuel gas to the gas engine 1; and a gas-leakage checking device 8 disposed in a fuel-gas supply pipe 89 disposed between the fuel-gas supply device 17 and the supply pipe 13, for checking gas leakage of safety shutoff valves. In the exhaust channel 16, an oxidation catalyst 16b for oxidizing and detoxifying carbon monoxide (CO) and hydrocarbon (HC) contained in the exhaust gas, a denitration device 16c for decomposing nitrogen oxide (NOx) contained in the exhaust gas into harmless nitrogen and water by injecting ammonia (NH3) and using a catalyst so as to obtain clean exhaust gas, a PM filter 16a for removing suspended particulate matters contained in the exhaust gas (PM: particulate matter), and the like are disposed in accordance with the required specification of the device. Thus, depending on the required specification of the exhaust-gas purification device to be mounted, the channel capacity of the exhaust channel 16 varies. Further, 23 is a rotation-speed sensor for measuring the cumulative rotation speed of slow-air turning upon startup of the gas engine.

Figure 2:
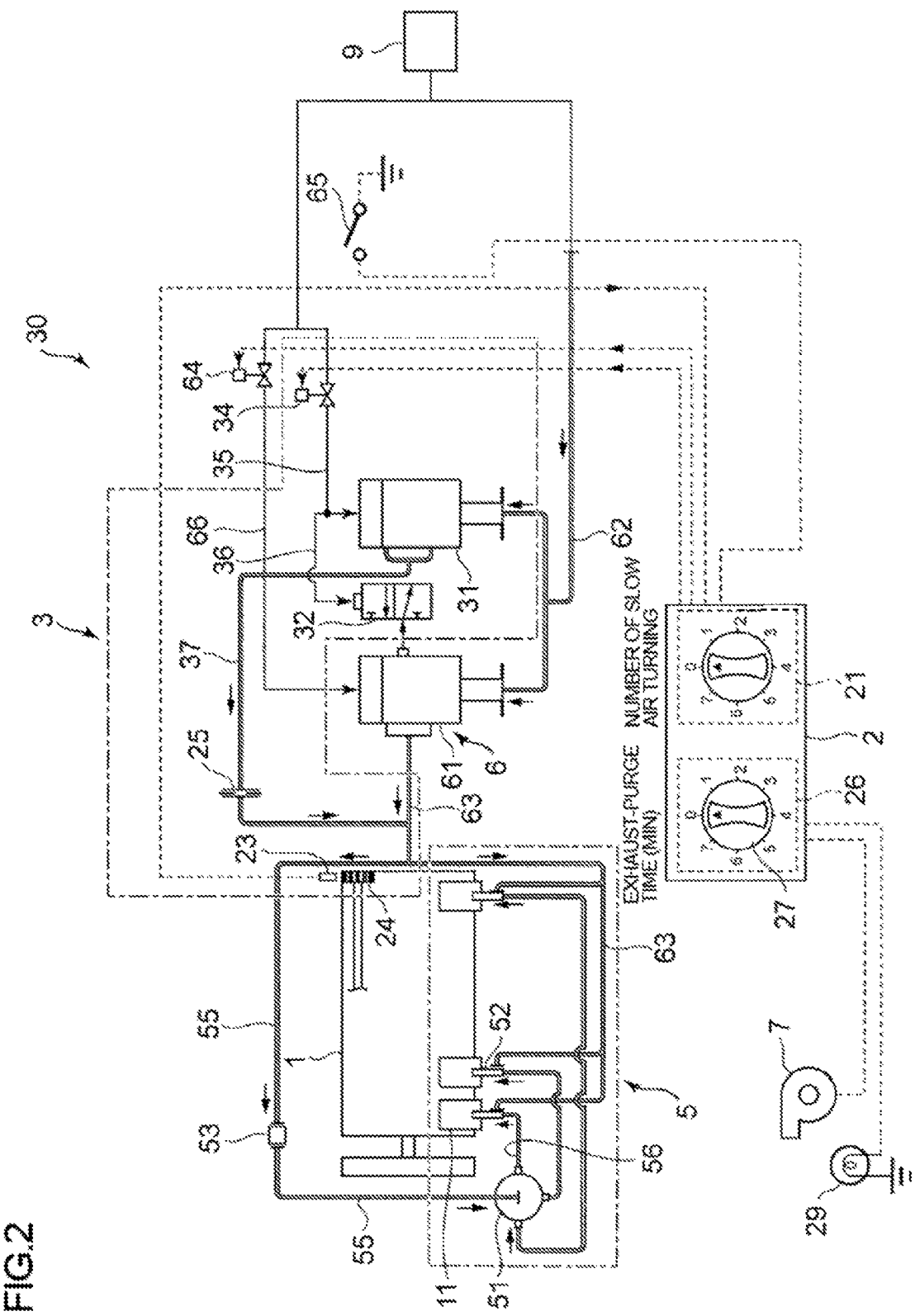
FIG. 2 is a schematic configuration diagram of an air starting device of a gas engine according to an embodiment.

FIG. 2 is a schematic configuration diagram of the air starting device 30.

The air starting device 30 includes a control device 2 for controlling operation of the air starting device 30, a main air-starting unit 6 which increases the gas engine 1 to a rotation speed for startup of fuel-gas ignition operation, and a compressed-air supply unit 3 for performing slow-air turning for checking the inside of each cylinder of the gas engine 1 and securing lubrication of the sliding surfaces between cylinders and pistons in the cylinders before operation of the main air-starting unit 6.

In the present embodiment, the control device 2 is a comprehensive control device which controls the air starting device 30, the exhaust purge fan 7 for exhaust purge and the gas-leakage checking device 8.

Figure 3:
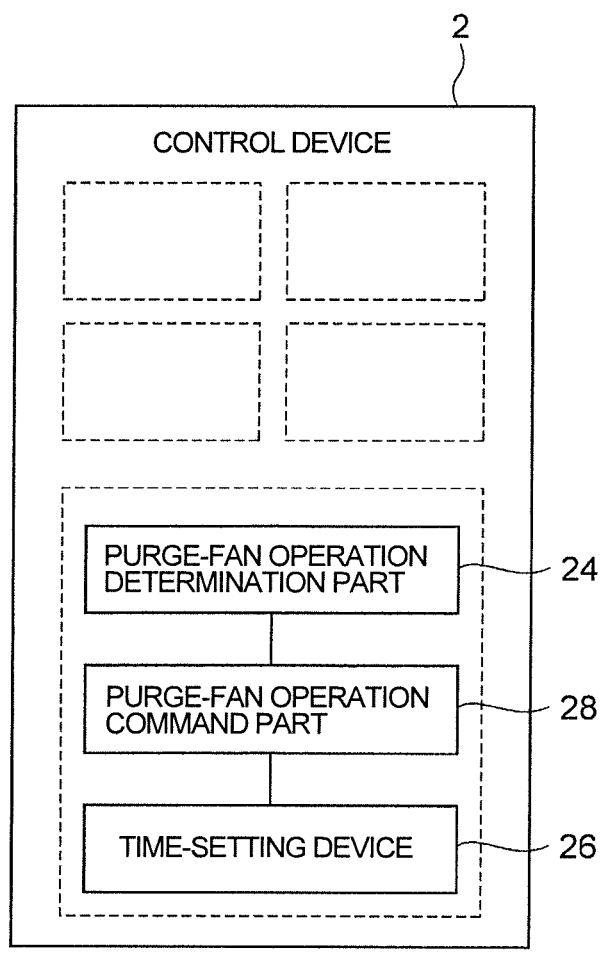
FIG. 3 is a configuration diagram of a control device according to an embodiment.

As illustrated in FIG. 3, the control device 2 includes the following in order to perform exhaust purge: a purge-fan operation determination part 24 configured to determine whether the exhaust purge fan 7 has been operated during the previous shutdown; a purge-fan operation command part 26 for operating the purge fan for a set period of time upon the next startup, if it is determined that the purge fan 7 has not been operated previously by the purge-fan operation determination part 24, and a time-setting device 26 for setting the period of time for operating the exhaust purge. The time-setting device 26 includes a time (minute) inputting switch 27 of a dial type capable of varying the operation time of exhaust purge in accordance with the capacity of the exhaust channel upon execution of exhaust purge. The main air starting unit 6 includes a main starting valve 61, an air starting switch 65 (hereinafter, switch is referred to in short as S/W) that operates the main starting valve 61 via the control device 2, a starting electromagnetic valve 64 that opens the main starting valve 61 via the first pipe 62 with compressed air from the compressed-air tank 9 if the air starting S/W 65 is switched on, and a compressed-air introduction unit 5 that introduces compressed air into the cylinders according to the order of ignition timing of the gas engine 1, the compressed air being supplied by opening the main starting valve 61. The opened main starting valve 61 sends the compressed air for operation for air startup toward the compressed-air introduction unit 5 via the first pipe 62.

The compressed-air introduction unit 5 includes: a starting-pipe control valve 51 which distributes pilot air to the cylinders of the gas engine 1 according to the order of ignition timing of the gas engine 1; a starting valve 52 that is mounted to a cylinder head 11 of the gas engine 1 and opened by pilot air from the starting-pipe control valve 51; the fourth pilot air pipe 56 coupling the starting-pipe control valve 51 and the starting valve 52; the third pilot air pipe 55 that is branched from the second pipe 63 and introduces pilot air to the starting-pipe control valve 51; and an interlock valve 53 disposed in the third pilot air pipe 55 for safety check that a fitting-and-disengaging device of an engine turning device is removed between the main starting valve 61 and the starting valve 52.

Here, a slow-air-turning main starting valve 31 comprises a structure such that the compressed air from the third pipe 37 is not discharged to the atmosphere from the slow-air-turning main starting valve 31 during operation of the main starting valve 61 while operation of the slow-air-turning main starting valve 31 is halted.

Accordingly, if the air starting S/W 65 is switched on, the starting electromagnetic valve 64 opens. The main starting valve 61 is opened by the compressed air from the starting electromagnetic valve 64. The compressed air passes through the first pipe 62, the main starting valve 61, the second pipe 63, the third pilot air pipe 55, and the interlock valve 53 in this order, thereby reaching the starting-pipe control valve 51 in the end. The starting-pipe control valve 51 sends pilot air to the starting valve 52 mounted to a cylinder that has reached the ignition timing of the time of the previous shutdown of the gas engine 1. The starting valve 52 opens, and the compressed air from the second pipe 63 is introduced into the cylinder from the starting valve 52. The piston in the cylinder is pressed by the compressed air, and the gas engine 1 starts rotation. If the gas engine 1 reaches a predetermined rotation speed, the gas engine 1 starts operation by fuel-gas ignition.

Once the gas engine 1 starts operating by fuel-gas ignition, the control device 2 closes the starting electromagnetic valve 64, as well as halting supply of the compressed air to the main starting valve 61 and closing the main starting valve 61. If the main starting valve 61 closes, the compressed air accumulating in the second pipe 63 and the third pilot air pipe 55 is discharged to the atmosphere from the main starting valve 61 via a switch valve 32 that is normally open. The main starting valve 61 comprises a structure such that the compressed air in the starting circuit may be discharged to the atmosphere if operation of the main starting valve 61 is halted, based, at least in part, on compressed air remaining in the compressed-air circuit of the compressed-air introduction unit 5 generates internal resistance of the gas engine 1 during fuel-gas operation.

Before the main air starting unit 6 is started, slow air turning is performed to check the inside of the cylinders of the gas engine 1, lubricate the piston ring and the cylinder liner inside the cylinder, and to check safety around the combustion chamber. In embodiments, in addition to the above reasons, in a case where shutdown may take place responsive to occurrence of an unpredictable event (e.g. emergency stop of the gas engine 1 due to loss of control power or the like) and exhaust purge is not performed on the exhaust channel 16 after the shutdown, fuel gas remaining in the fuel gas supply pipe 89 may flow out to and may accumulate in the gas engine 1 and the exhaust channel 16. In a case where non-combusted fuel gas has accumulated in the gas engine 1 and the exhaust channel 16 disposed on the downstream side of the gas engine 1, such non-combusted fuel gas may be discharged in order to prevent occurrence of abnormal combustion due to the accumulating fuel gas during fuel-gas ignition operation of the gas engine 1.

With reference to FIG. 2, the configuration of the compressed-air supply unit 3 for performing slow air turning will be described. The compressed-air supply unit 3 includes: the slow-air-turning main starting valve 31; a slow-air-turning electromagnetic valve 34 that opens the slow-air-turning main starting valve 31 by supplying pilot air to the slow-air-turning main starting valve 31 from the compressed-air tank 9 via the second pilot air pipe 35; the compressed-air introduction unit 5 that introduces the compressed air supplied as the slow-air-turning main starting valve 31 opens into the cylinders according to the order of ignition timing of the gas engine 1, an orifice 25 for pressure reduction disposed in the third pipe 37 connecting the second pipe 63 and the slow-air-turning main starting valve 31; a switch valve 32 mounted to the main starting valve 61 to prevent the compressed air from being discharged to the atmosphere from the halted main starting valve 61 during operation of the slow-air-turning main starting valve 31, a rotation-speed detection unit which detects the number of slow air turning (rotation speed of a crank shaft) of the gas engine 1; and a cumulative rotation-speed setting device 21 which is capable of closing the slow-air-turning electromagnetic valve 34 and varying a set value of the cumulative rotation speed optionally if the cumulative rotation speed of the rotation speed detected by the rotation-speed detection unit reaches the set value.

The switch valve 32 is mounted to the downstream side of the main starting valve 61, and opened by pilot air introduced by the fifth pilot air pipe 36 branched from the second pilot air pipe 35, so that the compressed air is not discharged to the atmosphere from the main starting valve 61 during operation of slow air turning. Accordingly, while the slow air turning is performed, the compressed air in the operation circuit of the slow air turning is prevented from being discharged to the atmosphere from the main starting valve 61, which makes it possible to perform operation of the slow air turning. Once the gas engine 1 starts to operate by fuel, the operation of the main starting valve 61 stops, and thereby the compressed air in the operation circuit of the slow air turning is discharged to the atmosphere from the main starting valve 61 to reduce occurrence of the compressed air becoming internal resistance of the gas engine 1.

Performing slow air turning makes it possible to eliminate remaining gas in the gas engine 1 and the exhaust channel 16. However, various exhaust-gas purification devices are disposed in the exhaust channel 16 in view of reduction of environmental pollution. As described above, the exhaust-gas purification devices include, for instance, the oxidation catalyst 16b, the denitration device 16c, the PM filter (PM; particulate matter) 16a for purifying exhaust gas, and the like, arranged in accordance with the required specification of the device. The specification of the exhaust-gas purification devices is varied depending on the characteristics of a usage area, demand of the client, or the like, and thus the capacity inside the exhaust channel 16 also varies. Accordingly, varying a set value of the cumulative rotation speed of slow air turning in accordance with the capacity inside the exhaust channel 16 makes it possible to reduce the cost by sharing the control device 2, as well as discharging air (which may contain fuel gas) in the gas engine 1 and the exhaust channel 16.

Further, according to embodiments, exhaust purge is operated before execution of the above slow air turning. The exhaust purge comprises the exhaust purge fan 7, the blast pipe 71 connected to the exhaust purge fan 7 at a first end and to the exhaust channel 16 at the downstream side of the turbocharger 14 with respect to the exhaust turbine at the other end, the time-setting device 26 provided for the control device 2, and a pilot lamp 29 which is an informing device for informing an operator of completion of exhaust purge, from a signal from the control device 2. The time-setting device 26 includes the time (minute) inputting switch 27 of a dial type for setting the operation time of exhaust purge.

The set time of the time setting device 26 can be set to be relatively long in duration if the capacity of the exhaust channel is large, and to be relatively short in duration if the capacity is small. Further, while the pilot lamp 29 is used as an informing device in the present embodiment, a buzzer may be used instead, or one or more of a buzzer and the pilot lamp 29 may be used together. In this case, the operator is informed that the exhaust purge has been completed and that the next operation may be performed, which makes it possible to remind the operator securely not to perform the next operation during the exhaust purge, and to perform safe starting operation for the gas engine.

With reference to FIG. 4, the control for performing exhaust purge will be described. The process starts from block S1, and in block S2, an operator confirms whether the set time of exhaust purge is set corresponding to the capacity of the exhaust channel. If the set time is not corresponding to the capacity of the exhaust channel, the time inputting S/W 27 of the time-setting device 26 is operated to correct the set time. In block S3, the operator issues a startup preparation command of an engine (a starting switch 65 is turned on) prior to starting the gas engine 1. In block S4, the control device 2 confirms whether an exhaust purge has been performed on the exhaust channel 16 during the previous shutdown of the gas engine 1.

If exhaust purge has not been performed, NO is selected and the process advances to block S5. In block S5, the control device 2 operates the exhaust purge fan 7 of exhaust purge for a set time to discharge air (that may contain fuel gas) in the exhaust channel 16 with the ambient air. The operation time may be determined in accordance with the capacity of the exhaust channel that varies depending on the arrangement specification of the various exhaust gas purification devices disposed in the exhaust channel 16.

After performing the exhaust purge for a predetermined period, the process advances to block S6, and the control device 2 informs (confirms) completion of the exhaust purge with the pilot lamp 29, which is an informing device. The operator can confirm that the exhaust purge is completed and that the next operation can be performed. The control device 2 is configured such that air startup (slow air turning), which is the next block, cannot be performed unless completion of the exhaust purge is confirmed by the control device 2. In block S4, if exhaust purge has been performed on the exhaust channel 16 during the previous shutdown of the gas engine 1, YES is selected and the process advances to block S25. Block 6 and following blocks are as described above, and thus not described in detail.

In this way, in a case where shutdown is caused by some reason (e.g. emergency stop of the gas engine 1 due to loss of control power or the like) and exhaust purge is not performed on the exhaust channel 16 after the shutdown, fuel gas remaining in the fuel gas supply pipe 89 flows out to and accumulates in the gas engine 1 and the exhaust channel 16. Upon startup, it is possible to prevent abnormal combustion in the exhaust channel 16 by automatically performing exhaust purge that has failed to be performed during the previous shutdown of the gas engine 1. It is also possible to prevent unnecessary operational errors because it is possible to confirm completion of the exhaust purge with the pilot lump 29 easily, which enables the operator to determine normal operation of the control device 2.

In the present embodiment, it is confirmed whether exhaust purge has been performed during the previous shutdown of the gas engine 1 (block S4 in FIG. 4), and exhaust purge is not performed before startup of the gas engine 1 if exhaust purge has been performed. However, exhaust purge before startup may be a requirement. With the execution of exhaust purge before startup being a requirement, even if temporary deformation (elastic deformation) or the like occurs to a seal portion of a number of valves due to an earthquake or the like, and fuel-gas leaks from the deformed part to accumulate in the exhaust channel 16 while the gas engine 1 is halted, it is possible to improve safety with respect to abnormal combustion in the exhaust channel 16 even further.

In this way, it is possible to provide a starting device for a gas internal combustion engine whereby non-combusted gas possibly accumulating in the gas engine 1 and the exhaust channel 16 is discharged upon ignition startup of the gas engine 1 and abnormal combustion is prevented so as to improve safety, breakage prevention, durability and reliability of the gas engine 1.

The invention claimed is:

1. A method for purging exhaust from a gas internal combustion engine, the method comprising:
    forming an exhaust channel via connecting an exhaust pipe to an exhaust collecting pipe of the gas internal combustion engine;
    connecting a blast pipe to an upstream portion of the exhaust pipe at a first end;
    connecting an exhaust purge fan to a second end of the blast pipe;
    sending ambient air to the exhaust channel; and
    controlling the exhaust purge fan via:
        determining whether the exhaust purge fan has been operated during a previous shutdown; and
        operating the exhaust purge fan for a set time, which is set in advance of a startup of the gas internal combustion engine if the exhaust purge fan has not been operated during the previous shutdown.

2. The method according to claim 1, further comprising: setting a value of a set time variable.

3. The method according to claim 1, further comprising: increasing the set time upon an increase in a capacity of the exhaust channel.

4. The method according to claim 1, further comprising: informing of completion of an exhaust purge if the exhaust purge is completed.

* * * * *